Feb. 11, 1958 C. F. AULT 2,823,275

CLIPPING AND CURRENT LIMITING CIRCUIT

Filed Dec. 30, 1954

INVENTOR.
CYRUS FRANK AULT
BY Darby & Darby
ATTORNEYS

United States Patent Office 2,823,275

Patented Feb. 11, 1958

2,823,275

CLIPPING AND CURRENT LIMITING CIRCUIT

Cyrus Frank Ault, Clifton, N. J., assignor to Allen B. Du Mont Laboratories, Inc., Clifton, N. J., a corporation of Delaware Application December 30, 1954, Serial No. 478,820

1 Claim. (Cl. 250—27)

The present invention relates to current-limiting circuits and particularly to such circuits which may be used as clipping circuits in, for example, television, radar and other similar fields. More particularly still, the invention relates to such clipping circuits which will handle large amplitude input signals without failing or overloading. If the input signal has a varying D. C. voltage level, it is usually necessary to restore this signal to a reference level before clipping. It has not been found to be practicable to effect clipping in the grid of the level restoring circuit. The prior art disclosed two alternate methods. One method of clipping the signal, is to drive the tube beyond cut-off. However, this method will not operate satisfactorily whenever the signal is of the wrong polarity or the amplitude is too small. In the second method, clipping is effected in the anode circuit of the level restoring stage. In this method the output signal will be clipped whenever the input signal is large enough to cause grid current to flow. However, the flow of grid current tends to introduce severe disturbances in the reference level. For the above reasons, the prior-art methods are not satisfactory.

The circuit of the present invention is one in which an electron tube having a cathode-clamping diode operates as a plate loaded amplifier during periods of diode conductance and as a cathode follower during periods of nonconductance of said diode and therefore is not subject to the disadvantages of the two methods presently in use and described above.

It is therefore one important object of my invention to provide a novel circuit capable of being used as a current limiting device and as a clipping device.

Another object of my invention is to provide an anode clipping circuit notable for its absence of grid current flow.

Still another object of my invention is to provide an improved clipping circuit used as a cathode load.

A further object of my invention is to provide a novel clipping circuit capable of handling either positive-going or negative-going input signals.

A further object of my invention is to provide a novel clipping circuit capable of operation with input signals having a wide range of amplitude.

A still further object of my invention is to provide a novel current limiting device capable of limiting the flow of current to an optimum value for either a positive or negative input signal.

These and other objects will become apparent from the following specification, taken in conjunction with the drawings, of which:

This invention contemplates a novel circuit to be used as a cathode load resistance, wherein at predetermined conditions, the characteristics of the cathode load circuit are caused to change, thus modifying the output signal.

Certain terms used in this application are defined as follows:

"Upvolting" means to raise the potenial but not necessarily to a positive value.

"Downvolting" means to lower the potenial but not necessarily to a negative value.

"Conductivate" means to cause a tube to become conductive.

Figure 1:
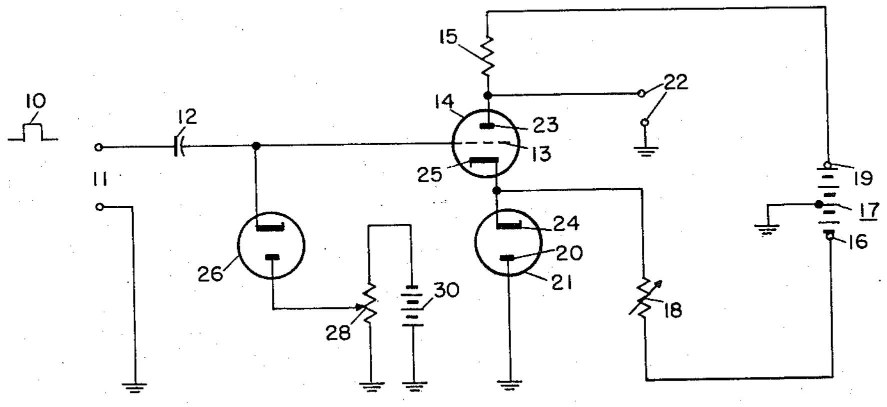
Figure 1 represents a clipping circuit utilizing the instant invention.

Referring now to Figure 1, during a period of quiescence, that is to say when no signal is applied to the grid 13 of tube 14, electrons will flow from negative terminal 16 of power supply 17, through series cathode load resistor 18, cathode 25, anode 23, series plate load resistor 15, back to the positive terminal 19 of power supply 17. There is a concurrent electron flow from terminal 16 through resistor 18 and clamp tube 21 (which is therefore normally conductive) and then through ground back to the power supply. To provide for such current flow cathode 24 of tube 21, and cathode 25 of tube 14, are below ground potential, while anode 20 of diode 21 is at some higher potenial, preferably at ground potential, as shown. The tube 14 therefore may be considered as having a composite cathode load resistance comprising a high-value resistance 18 shunted by a low forward resistance, which low forward resistance is present when tube 21 is conducting. Tube 14 thus acts as a plate loaded amplifier with a low cathode resistance, and an output signal may be obtained at terminals 22, one of which is connected to anode 23 and the other to ground.

When a signal of varying amplitude is applied to control grid 13, a similar but inverted amplified waveform appears at output terminals 22. The circuit of Fig. 1 will be used for explaining the operation when a positive-going input waveform 10 is applied to a pair of input terminals 11. One of the terminals 11 is at ground potential and the other is connected through capacitor 12 to control grid 13 of amplifier tube 14. The input waveform is maintained at a given reference level by the combination of tube 26, potentiometer 28 and source 30, a method well known by those skilled in the art.

If control grid 13 is upvolted by input signal 10, tube 14 conducts more heavily than during quiescence. Due to the characteristics of the resistor 18 and diode 21, and the voltages across them, the current through tube 21 is slightly increased for a short interval, and then decreased as will be hereinafter discussed. Most of the increased current however flows through resistor 18. This increase in current causes a greater voltage drop across resistor 18, and the cathodes 24 and 25 of tubes 21 and 14 respectively tend to be upvolted.

This upvolting of the cathodes is resisted by the conduction of tube 21 which tends to clamp cathodes 24 and 25 to ground. However, as soon as cathode 24 is upvolted, the potential across tube 21 decreases and it therefore takes progressively less and less current until it finally becomes non-conductive. At the instant of nonconductance, the composite cathode load resistance of tube 14 suddenly changes from a high resistance 18 shunted by the low forward resistance of tube 21, to the high resistance 18 alone. Amplifier tube 14 under these conditions now acts as a cathode-follower, and cathode 25 follows control grid 13 as the grid is further upvolted.

As it is known to those skilled in the art, when both the control grid and the cathode of a tube, operating as a cathode-follower, are simultaneously upvolted additional current is prevented from flowing, thus limiting the maximum current flow through the tube. Since the current is thus limited no further signal will appear at the anode, and the output signals will be clipped. It is also known that, under cathode-follower operation, the grid remains at a relatively negative potential compared to the cathode, and therefore no grid current is drawn.

Thus, the above mentioned embodiment of my novel invention limits the current in the anode circuit, and clips and discards the more positive portions of the input signal, and also prevents the drawing of grid current, which in prior art circuits disturbed the previously established input voltage reference level established by tube 26 and its associated circuit.

Figure 2:
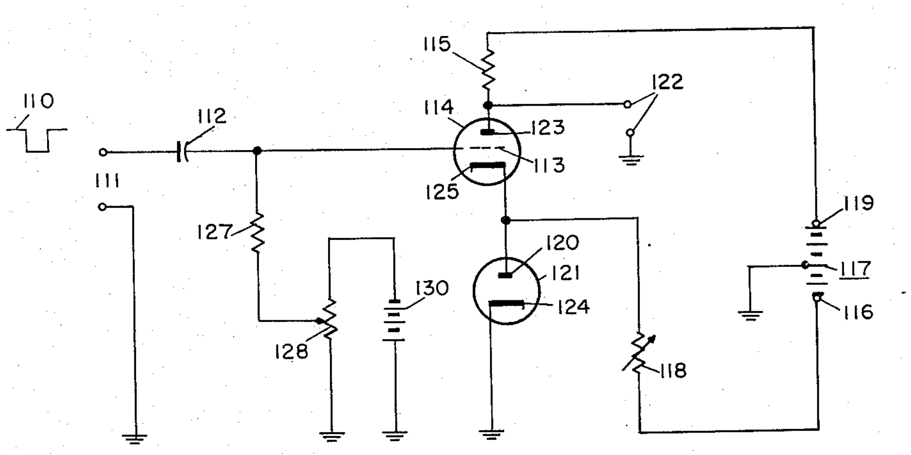
Figure 2 depicts another embodiment of this invention.

Referring now to Figure 2, there is shown another embodiment of my invention which permits the utilization of negative-going input signals.

The circuit herein described is similar to that of Figure 1 except that clamp tube 121, is now reversed relative to tube 21 of Figure 1. Additionally in Figure 2 a resistor 127 is shown in place of tube 26 of Figure 1; the tube and resistor are however direct equivalents and either may be utilized in either of the two circuits.

The action of amplifier tube 114 is similar to that of tube 14 previously described. During quiescence, tube 114 is conductive and current flows through resistor 118 and clamp tube 121. Due to the low forward resistance of clamp tube 121 when conductive, tube 114 acts like a plate loaded amplifier. As the negative-going input signal 110 downvolts grid 113, progressively less and less current flows through clamp tube 121 and it eventually becomes non-conductive. During the period of nonconductance of the clamp tube, amplifier tube 114 acts as a cathode follower as previously described. The result is that the current is prevented from going below, or is limited to, a maximum negative value and the more negative portions of the input waveform are clipped.

The clipping level of the circuits as described, is determined by the voltage at which clamp tubes 21 and 121 begin to conduct. The clipping level may be adjusted in various ways, one way being to adjust the bias of amplifier tubes 14 and 114 by means of potentiometers 28 and 128 respectively. Placing the level adjusting control in the grid biasing circuit assures that the amplifier tubes will always operate near the point of maximum gain.

Another method of controlling the clipping level is to vary the resistor 18 and thus decelerate the upvolting which decouples the rectifier. Other methods will occur to those versed in the art.

It will also be seen that my invention may be used as a current limiting device to protect a tube or circuit, either with or without its clipping action.

While the clamp tube has been shown and described as a vacuum tube rectifier, it is, of course, within the scope of those skilled in the art to use other known types of rectifiers. The circuits of Figures 1 and 2 may be of course combined to provide both top and bottom clipping.

Having described several embodiments, I desire to be limited only by the appended claim.

What is claimed is:

The combination comprising: an electronic amplifier having a cathode, an anode, and a control grid, said amplifier adapted to act either as a cathode follower or a plate loaded amplifier; means causing said amplifier to act as a plate loaded amplifier, said means comprising a substantially direct connection between said cathode and ground; means to apply an input signal to said grid; means causing said amplifier to act as a cathode follower, said means comprising a resistance connected between said cathode and ground; means causing said resistance to be substituted for said substantially direct connection when said input signal exceeds a predetermined value whereby the operation of said amplifier changes from that of a plate loaded amplifier to a cathode follower amplifier, and limits the current flowing through said amplifier.

References Cited in the file of this patent

UNITED STATES PATENTS

| | | |
|---|---|---|
| 2,285,044 | Morris | June 2, 1942 |
| 2,509,742 | Mynall | May 30, 1950 |
| 2,647,209 | Krause | July 28, 1953 |